United States Patent
Albracht et al.

(10) Patent No.: US 6,790,894 B1
(45) Date of Patent: Sep. 14, 2004

(54) RUBBER-BASED SOUNDPROOFING MATERIAL

(75) Inventors: Frank Albracht, Waltershausen (DE); Gerd Lotze, Dresden (DE); Karl-Heinz Krause, Chemnitz (DE); Gerhard Merkmann, Gotha (DE); Wolfgang Timm, Gotha (DE)

(73) Assignee: Thüringen GmbH, Waltershausen (DE)

( * ) Notice: Subject to any disclaimer, the term of this patent is extended or adjusted under 35 U.S.C. 154(b) by 38 days.

(21) Appl. No.: 10/148,860

(22) PCT Filed: Nov. 22, 2000

(86) PCT No.: PCT/DE00/04204

§ 371 (c)(1),
(2), (4) Date: Jun. 5, 2002

(87) PCT Pub. No.: WO01/42343

PCT Pub. Date: Jun. 14, 2001

(30) Foreign Application Priority Data

Dec. 7, 1999 (DE) .......................................... 199 58 816
May 10, 2000 (DE) .......................................... 100 22 838

(51) Int. Cl.$^7$ ................................................. C08L 3/10
(52) U.S. Cl. ........................ 524/434; 524/435; 524/430; 524/424; 524/495; 524/571; 524/551; 428/462; 428/465; 428/500
(58) Field of Search ................................ 524/430, 431, 524/434, 435, 439, 440, 526, 527, 565, 567, 570; 428/465, 469, 492, 500

(56) References Cited

U.S. PATENT DOCUMENTS

| | | | |
|---|---|---|---|
| 3,652,360 A | | 3/1972 | Hartman et al. ............. 156/244 |
| 3,713,787 A | * | 1/1973 | Kuniyasu et al. ........... 428/600 |
| 4,189,424 A | | 2/1980 | Takamatsu ............... 260/42.15 |
| 4,302,361 A | * | 11/1981 | Kotani et al. ................ 252/503 |
| 4,470,898 A | * | 9/1984 | Penneck et al. ............. 252/511 |
| 4,545,117 A | * | 10/1985 | Okamoto ....................... 29/596 |
| 4,822,834 A | * | 4/1989 | Blevins ....................... 524/427 |
| 5,118,546 A | * | 6/1992 | Burlett et al. .............. 428/36.8 |
| 5,192,624 A | * | 3/1993 | Morimoto .................... 428/596 |
| 5,545,861 A | * | 8/1996 | Morimoto .................... 181/290 |
| 5,824,728 A | | 10/1998 | Laney ......................... 524/435 |

FOREIGN PATENT DOCUMENTS

| | | |
|---|---|---|
| JP | 01 172484 | 7/1989 |
| JP | 10 087943 | 4/1998 |

* cited by examiner

Primary Examiner—David W. Wu
Assistant Examiner—Rip A. Lee
(74) Attorney, Agent, or Firm—Collard & Roe, P.C.

(57) ABSTRACT

A rubber-based soundproofing material comprises a mixture of a rubber blend, a metal or its oxides, alloys or salts, and conventional mixing ingredients. The mixture is either a non-blended chlorobutyl rubber, bromobutyl rubber or acrylate rubber, or a blend of nitrile rubber or styrene-butadiene rubber with epoxidized natural rubber. The mixture has the following proportions: 10–15% by wt. rubber or rubber blend, 85–40% by wt. metal or its oxides, alloys or salts, and 5–10 wt. % mixing ingredients.

5 Claims, 2 Drawing Sheets

RUBBER-BASED SOUNDPROOFING MATERIAL

CROSS REFERENCE TO RELATED APPLICATIONS

Applicants claim priority under 35 U.S.C. §119 of German Application Nos. 199 58 816.3 and 100 22 838.0 filed Dec. 7, 1999 and May 10, 2000, respectively. Applicants also claim priority under 35 U.S.C. §120 of PCT/DE00/04204 filed Nov. 22, 2000. The international application under PCT article 21 (2) was not published in English.

The invention relates to a rubber material for soundproofing, whereby the vulcanized rubber mixture consists of the following components, specifically a rubber or rubber blend;

a heavy metal and/or its alloys and/or its oxides and/or it salts in the form of powder; as well as the conventional mixing ingredients.

A rubber material of the type specified above is known, for example from published patent document U.S. Pat. No. 3,652,360.

Soundproofing comprises both sound reduction and sound absorption. The property of reflecting the incident sound waves more or less extensively and permit them to pass through the material only to a minor extent is associated with the term sound reduction. In connection with sound absorption, the vibration energy of the sound is converted into thermal energy and thus irreversibly withdrawn from the vibration process. The rubber material is consequently required to have a high mechanical loss factor.

Now, against the background of the partial physical processes taking place in connection with sound insulation as described above, the problem is to provide a rubber material that, in the presence of a high weight (e.g. weight per unit of area), is characterized by a low module of elasticity (E-module);

a low degree of stiffness, as well as a high mechanical loss factor.

Said problem is solved by a rubber mixture based on chlorobutyl rubber (CIIR), bromobutyl rubber (BIIR), or acrylate rubber (ACM), each in the non-blended form, or nitrile rubber (NBR) or styrene-butadiene rubber (SBR), both blended with epoxidized natural rubber (ENR), whereby the rubber mixture comprises the following quantitative proportions:

Rubber or rubber blend heavy metal and/or its alloys 10% to 50% by weight and/or its oxides and/or its salts 85% to 40% by wt. mixture ingredients 5% to 10% by wt.

A heavy metal of the $4^{th}$ period of the elements of the secondary group is advantageously used, where, in turn, the $8^{th}$ secondary group comprising iron (Fe), cobalt (Co) and Nickel (Ni) is of special importance. In the overall group of heavy meals specified above, their alloys and/or their oxides and/or their salts are useful components of the mixture as well. Of special importance is in this connection a substantially pure iron or an iron-carbon alloy (e.g. gray cast), or the iron oxide $Fe_3O_4$, which is a mixed oxide consisting of FeO and $Fe_2O_3$.

The quantitative ratio of NBR or SBR to ENR within the framework of the respective rubber blend amounts to from 50:50 to 90:10, in particular 70:30.

The heavy metal and/or its alloys and/or its oxides and/or its salts usefully have a grain size of from 10 to 80 $\mu$m, in particular of 15 to 45 $\mu$m, and in particular again of from 30 to 40 $\mu$m.

The advantageous quantitative proportions of the rubber mixture are as follows:

Rubber or rubber blend 15 to 30% by weight

Heavy metal and/or its alloys and/or its oxides and/or its salts 80 to 60% by weight The usual mixing ingredients 5 to 10% by weight.

The conventional mixing ingredients are in most cases vulcanizing agents (e.g. sulfur or sulfur donors), accelerators, carbon black, ZnO, as well as anti-ageing agents.

The rubber mixture as defined by the invention is advantageously produced by means of a method that is characterized by the following steps of the method:

The partial rubber mixture comprising the rubber or rubber blend as well as the conventional mixing ingredients is produced in an internal mixer.

By means of mastication with the help of a rolling mill, the rubber mixture is prepared for receiving the heavy metal and/or its alloys and/or its oxides and/or its salts.

The heavy metal and/or its alloys and/or its oxides and/or its salts are blended into the rubber mixture.

The total mixture is homogenized in the rolling mill.

The vulcanization of the homogenized total mixture is subsequently carried out by supplying heat to a suitable pressing mold, or by calendering with subsequent vulcanization.

A comparative test is described in the following. In that test, the two different rubber materials (A, B) based on BIIR differ from each other in the presence of the same sample size (plate with an surface area "S" of 0.09 $m^2$ and a thickness "h" of 3 mm) only in that the rubber material (B) contains 80% by weight Fe-powder, specifically with a grain size of from 30 to 40 $\mu$m.

The measuring criteria and measured values are specified in the following table:

| Measuring criteria | A | B |
|---|---|---|
| E-modulus [MPa] at T = 20° C. | 5 | 30 |
| Tension value [N/mm$^2$] at 100% elongation | 1.16 | 0.87 |
| Mechanical loss factor | .29 | .34 |
| Density $\rho$ [kg/m$^3$] | 1100 | 3500 |
| Area weight M [kg/m$^2$]; M = $\rho$h | 3.3 | 10.5 |

As compared to the material (A), the material (B) as defined by the invention does in fact have a 6-times higher E-modulus; however, of decisive importance in the present case is the comparison with steel, which has an E-modulus of $2.1 \times 10^5$ MPa. This means that the required low E-modulus has been achieved.

Furthermore, in connection with the problem specified above, as compared to the material (A), the rubber material (B) as defined by the invention is characterized by a higher weight by unit of area; lower stiffness (tension value), as well as by a higher mechanical loss factor in the presence of low inherent heating of the rubber material, because it was possible in that regard to raise the thermal conductivity by the Fe-powder. The increase in stressability and the thermal stability of the rubber material have consequently been achieved.

Now, the invention is explained in the following with the help of exemplified embodiments and by reference to schematic drawings and diagrams. In the drawing, FIG. 1 shows the cross section through a board-shaped rubber material without additional material added to it;

Figure 1:
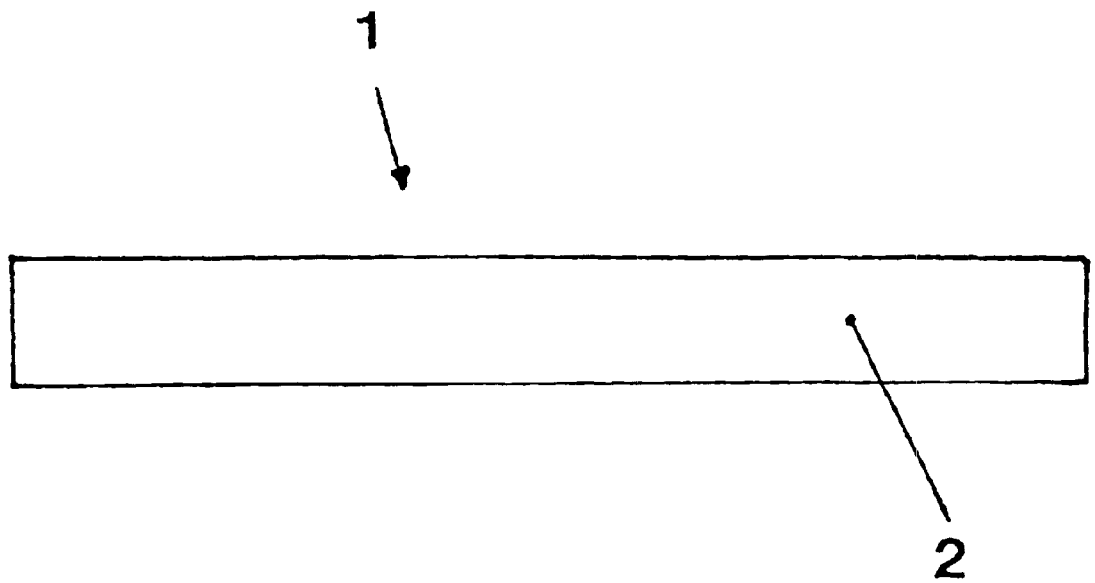

According to FIG. 1, the elastomer board 1 only consists of the rubber material 2 as defined by the invention.

Figure 2:
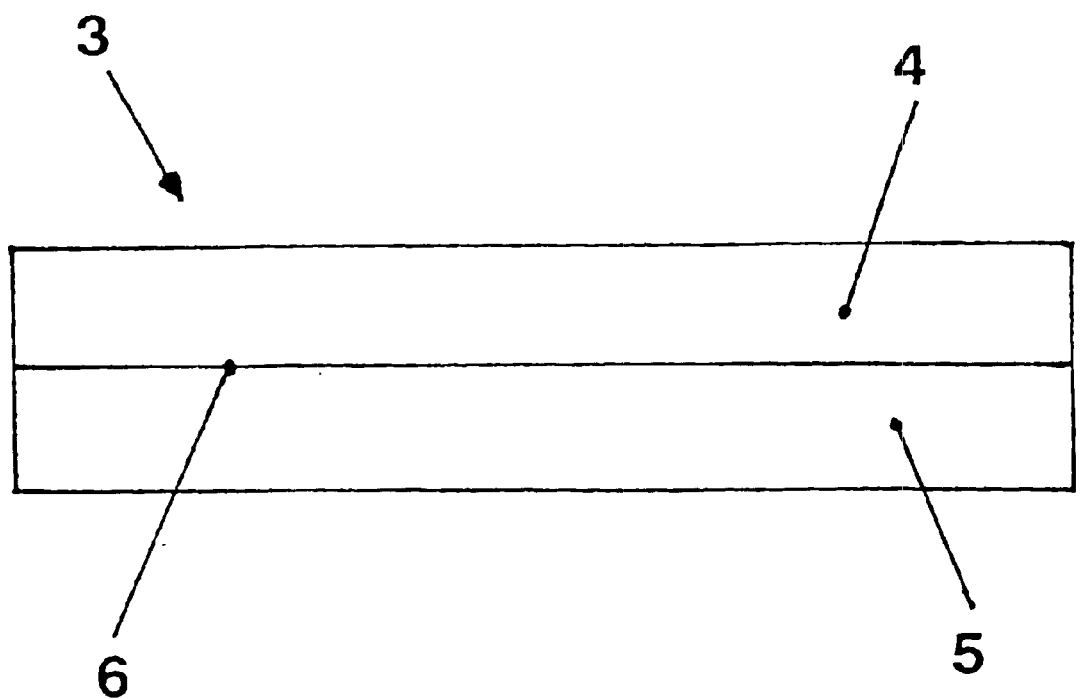
FIG. 2 shows the cross section through a board-shaped rubber material with the additional material added to it, forming a composite system.

Contrary to this, the elastomer board 3 according to FIG. 2 is a composite system comprising the rubber material 4 as defined by the invention and an additional material 5 added to that material, which in particular is a highly porous sound absorber, in particular again on the basis of a sintered metal fiber non-woven material. The added material also may be a steel sheet. A suitable adhesive agent is used in the area of the contact surface 6 for the purpose of keeping the composite system together.

Figure 3:
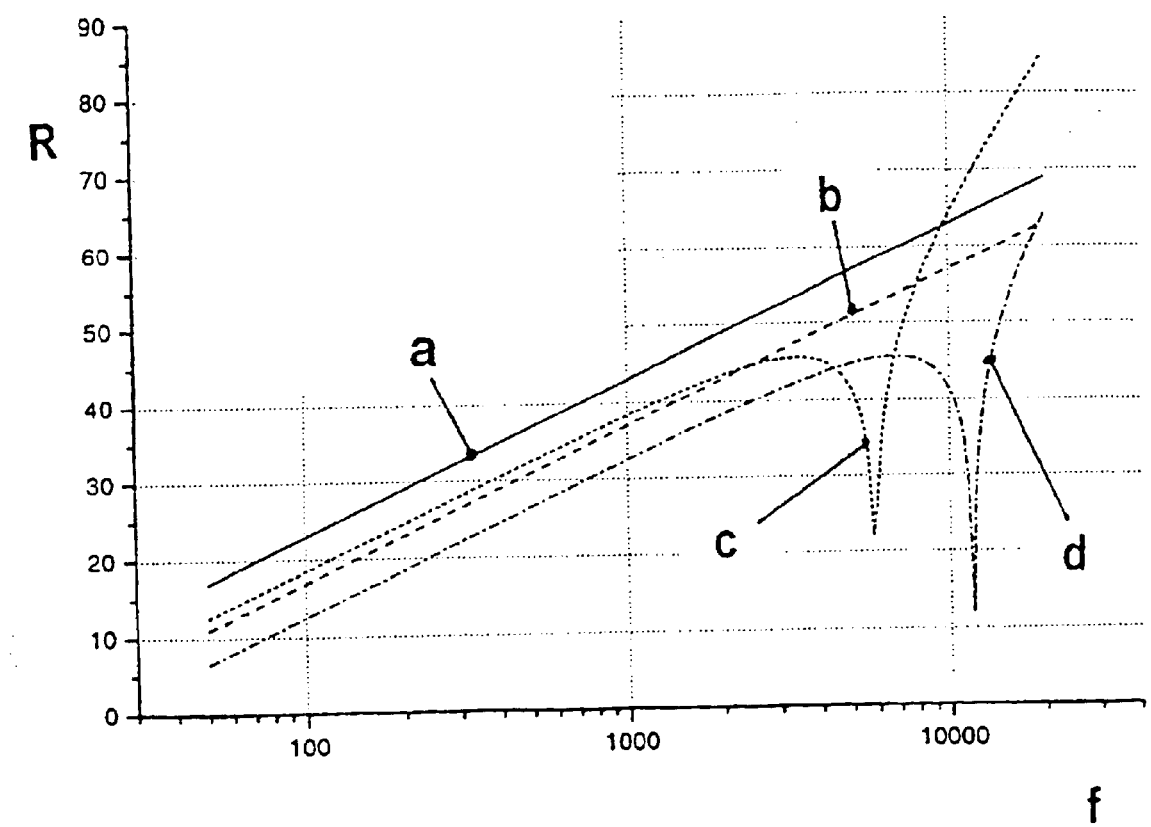
FIG. 3 is a diagram showing four test curves.

Now, FIG. 3 is a diagram showing the four test curves a, b, c and d under the following measuring criteria:

Ordinate: Sound insulation measure R [dB]

Abscissa: Frequency f [Hz]

Curve a: Rubber material based on BIIR with 80% by wt Fe-powder with a grain size of 30 to 40 μm Thickness h=10 mm; surface weight M=35 g/m²

Curve b: Rubber material (curve a); thickness h=5 mm; area wt. M=17.5 kg/m²

Curve c: steel sheet thickness h=2 mm; area wt. M=15.6 kg/m²

Curve d: steel sheet thickness h=1 mm; area wt. M=7.8 kg/m2.

The curves a and b pertaining to the rubber material as defined by the invention show a linear development of the curve with respect to the soundproofing behavior in the frequency range of audible sound, whereas with the use of the steel sheet (=curves c and d), a soundproofing break occurs in the range of audible sound. Furthermore, a very high limit frequency ($f_g$) is achieved with the rubber material as defined by the invention, which, in connection with a weight per unit of area M of=35 kg/m², comes to about $f_g$=100 kHz and is thus far out of the range of audible sound.

A substantially pure Fe-powder was used within the framework of the overall test described herein.

Supplementary tests with gray cast and $Fe_3O_4$, in which the test conditions were the same otherwise, did not result in any significant changes in the level of the test data.

What is claimed is:

1. A rubber-based soundproofing material comprising a mixture of:

a rubber or a rubber blend comprising non-blended chlorobutyl rubber, bromobutyl rubber or acrylate rubber, or a blend of nitrile rubber or styrene-butadiene rubber with epoxidized natural rubber;

an iron/carbon alloy in the form of powder; and additional mixing ingredients comprising an agent selected from the group consisting of vulcanizing agents, accelerators, carbon black, ZnO, and anti-ageing agents;

wherein the rubber mixture comprises the following quantitative proportions:

| Rubber or rubber blend | 10 to 50% by wt. |
|---|---|
| Iron/carbon alloy | 85 to 40% by wt. |
| additional mixing ingredients | 5 to 10% by wt. |

2. A rubber-based soundproofing material comprising:

a rubber blend of nitrile rubber or styrene-butadiene rubber with epoxidized natural rubber, wherein the quantitative ratio of nitrile rubber or styrene-butadiene rubber to epoxidized natural rubber is from 50:50 to 90:10;

a metal or its alloys or its oxides in the form of powder; and additional mixing ingredients comprising an agent selected from the group consisting of vulcanizing agents, accelerators, carbon black, ZnO, and anti-ageing agents;

wherein the rubber mixture comprises the following quantitative proportions:

| Rubber blend | 10 to 50% by wt. |
|---|---|
| Metal or its alloys or its oxides | 85 to 40% by wt. |
| additional mixing ingredients | 5 to 10% by wt. |

3. The rubber-based soundproofing material according to claim 2, wherein the quantitative ratio of nitrile rubber or styrene-butadiene rubber to epoxidized natural rubber amounts to 70:30.

4. A rubber-based soundproofing material comprising a mixture of:

a rubber or a rubber blend comprising non-blended chlorobutyl rubber, bromobutyl rubber or acrylate rubber, or a blend of nitrile rubber or styrene-butadiene rubber with epoxidized natural rubber;

a metal or its alloys or its oxides in the form of powder; and additional mixing ingredients comprising an agent selected from the group consisting of vulcanizing agents, accelerators, carbon black, ZnO, and anti-ageing agents;

wherein the mixture comprises the following quantitative proportions:

| Rubber or rubber blend | 10 to 50% by wt. |
|---|---|
| Metal or its alloys or its oxides | 85 to 40% by wt. |
| additional mixing ingredients | 5 to 10% by wt; | wherein the material is attached to an additional highly porous sound absorbing material for forming a composite material.

5. The rubber-based sound-proofing material according to claim 4, wherein the additional material is a sintered non-woven metal fiber.

* * * * *

UNITED STATES PATENT AND TRADEMARK OFFICE
CERTIFICATE OF CORRECTION

PATENT NO. : 6,790,894 B1
DATED : September 14, 2004
INVENTOR(S) : Albracht et al.

It is certified that error appears in the above-identified patent and that said Letters Patent is hereby corrected as shown below:

Title page,
Item [73], Assignee, please change "Thüringen GmbH" to correctly read -- Intech Thüringen GmbH --

Signed and Sealed this

Twenty-ninth Day of March, 2005

JON W. DUDAS
*Director of the United States Patent and Trademark Office*